United States Patent [19]

Kageyama

[11] Patent Number: 5,196,937
[45] Date of Patent: Mar. 23, 1993

[54] CONTRAST CORRECTION DEVICE FOR CORRECTING VIDEO SIGNAL CONTRAST BY VARYING LUMINANCE SIGNAL

[75] Inventor: Atsuhisa Kageyama, Ibaraki, Japan

[73] Assignee: Matsushita Electric Industrial Co., Ltd., Osaka, Japan

[21] Appl. No.: 707,003

[22] Filed: May 29, 1991

[30] Foreign Application Priority Data

May 31, 1990 [JP] Japan ................... 2-143158

[51] Int. Cl.⁵ .............................. H04N 5/57
[52] U.S. Cl. .................. 358/169; 358/168; 358/164; 358/32
[58] Field of Search ............... 358/166, 168, 169, 164, 358/32, 37

[56] References Cited

U.S. PATENT DOCUMENTS

| | | | |
|---|---|---|---|
| 4,152,720 | 5/1979 | Fenton | 358/27 |
| 4,489,349 | 12/1984 | Okada | 358/168 |
| 4,686,562 | 8/1987 | Yamanaka | 358/164 |
| 4,799,106 | 1/1989 | Moore | 358/168 |
| 4,829,381 | 5/1989 | Song | 358/164 |
| 4,980,756 | 12/1990 | Lagoni | 358/168 |
| 5,003,394 | 3/1991 | Lagoni | 358/168 |

*Primary Examiner*—James J. Groody
*Assistant Examiner*—Sherrie Hsia
*Attorney, Agent, or Firm*—Wenderoth, Lind & Ponack

[57] ABSTRACT

A contrast correction device for correcting a contrast of an image formed by video signals includes a brightness/darkness detecting circuit for detecting a tone level of the image and for producing a bright signal when the tone level is greater than a predetermined brightness, and a dark signal when the tone level is less than a predetermined darkness. A correction circuit is provided for correcting a luminance signal by a negative gamma correction in response to the bright signal, and a positive gamma correction in response to the dark signal. Thus, the contrast of bright areas in the image are enhanced when the bright signal is produced, and the contrast of bright areas in the image are suppressed when the dark signal is produced.

4 Claims, 9 Drawing Sheets

CONTRAST CORRECTION DEVICE FOR CORRECTING VIDEO SIGNAL CONTRAST BY VARYING LUMINANCE SIGNAL

BACKGROUND OF THE INVENTION

1. Field of the Invention

The present invention relates to a television receiver and, more particularly, to a contrast correction device which can be used to correct the contrast in a video signal in a television receiver, a video cassette recorder, or the like.

2. Description of the Prior Art

As the screen size of color television receivers has increased in recent years, contrast correction devices have become increasingly important as a means of expanding the dynamic range of the video signal reproduced on the CRT screen by correcting the contrast of the video signal for a sharper image by passing the video signal through a non-linear amplifier such as a gamma correction device.

One type of such device is a described below with reference to the accompanying figures.

Figure 6:
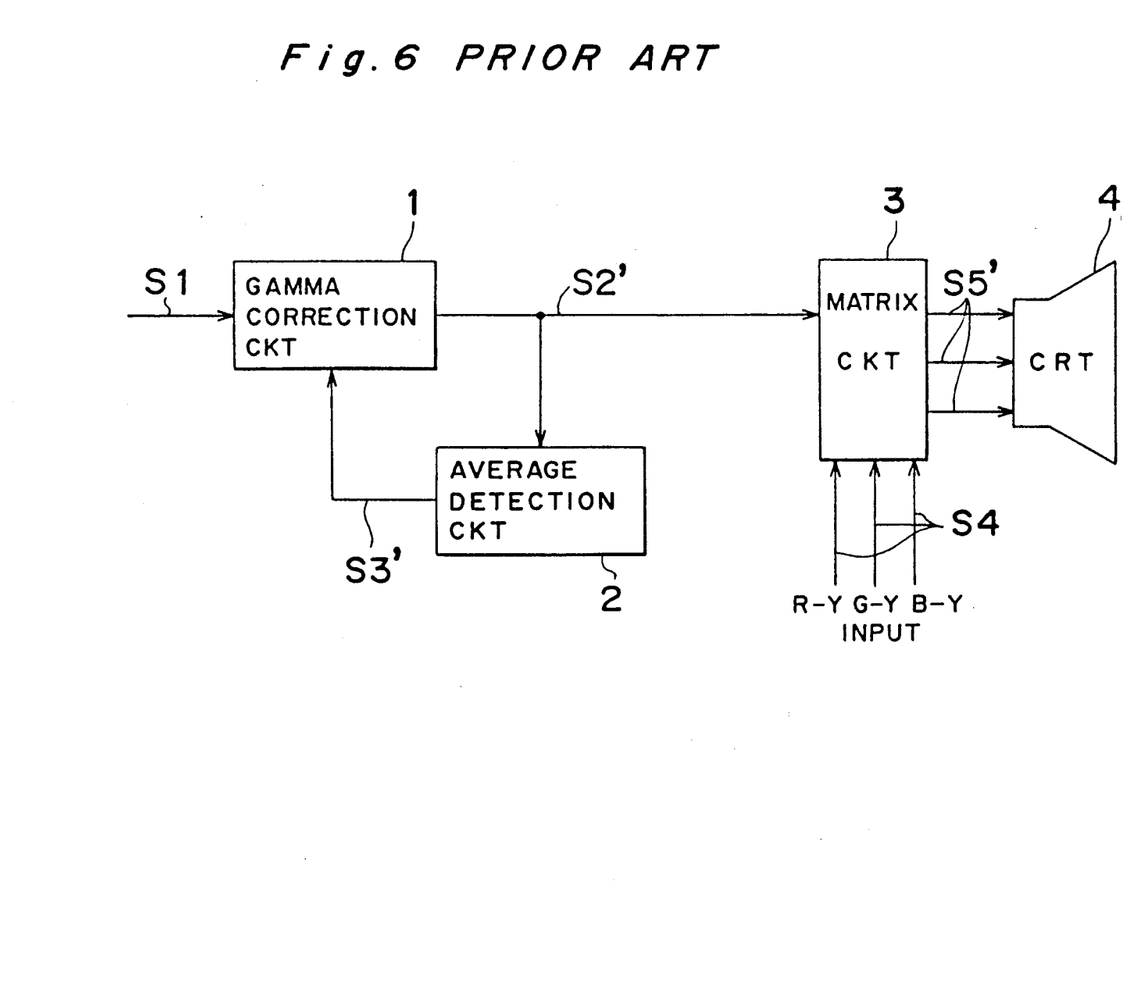
FIG. 6 is a block diagram of a first example of a conventional contrast correction device.
Figure 7A:
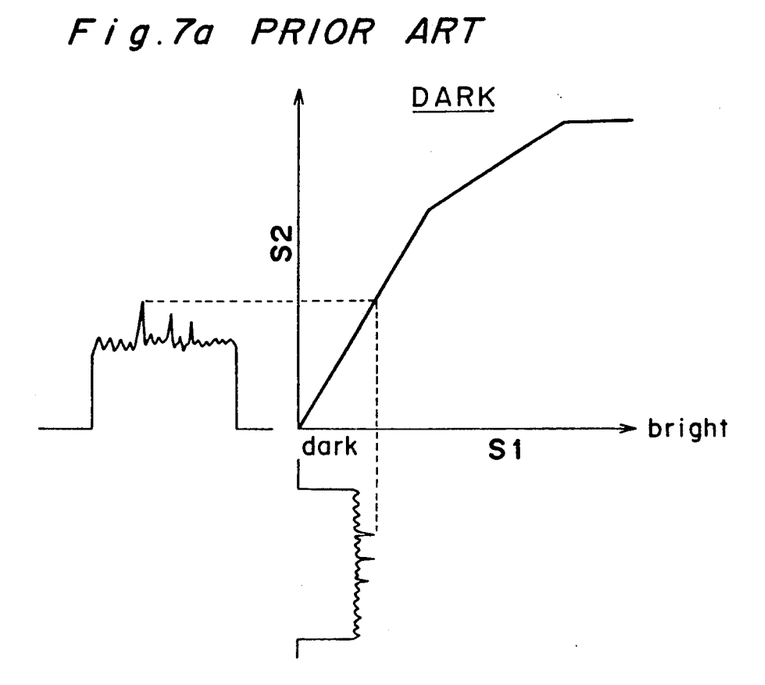
FIGS. 7a and 7b are graphs showing the input-output characteristics observed in the contrast correction device shown in FIG. 6.
Figure 7B:
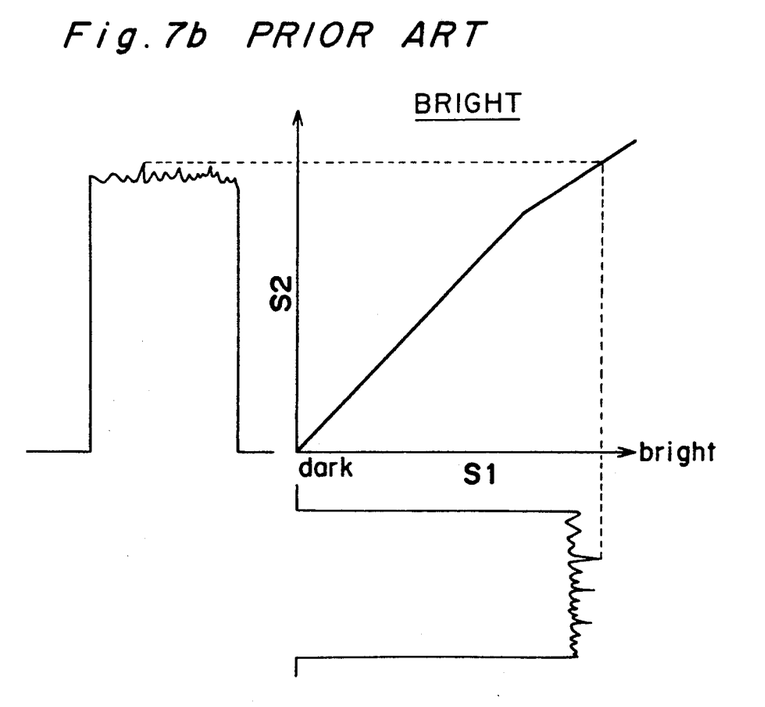

FIGS. 6, 7a and 7b are, respectively, a block diagram and graphs showing the input/output relationship in a first example of a conventional contrast correction device. As shown in FIG. 6, the contrast correction device comprises a gamma correction circuit 1 which corrects the luminance signal S1 input thereto so as to suppress white or bright tones according to an average detected luminance signal S3'; an average luminance detection circuit 2 which averages the luminance signal S2' over one or a plurality of frames and produces an average detected luminance signal S3'; and a matrix circuit 3 which adds the luminance signal S2' and an input color difference signal S4 to output the color signal S5' to CRT 4.

A contrast correction device thus constructed operates as described below.

First, the post-correction luminance signal S2' is input to the average luminance detection circuit 2 for averaging the signal S2' over a predetermined time which may be more than one vertical scan period to detect the average luminance signal S3'. The detected average luminance signal S3' is input to the gamma correction circuit 1. The gamma correction circuit 1 changes the input-output characteristics according to the average detected luminance signal S3' as shown in FIGS. 7a and 7b.

More specifically, when the average detected luminance signal S3' is dark, white or light tones are suppressed and black tones are enhanced as shown in FIG. 7a. On the contrary, when the average detected luminance signal S3' is of bright the, suppression white or light tones is weakened as shown in FIG. 7b so that white or light tones are enhanced more than that which resulted from the case shown in FIG. 7a. The thus obtained post-correction luminance signal S2' is input to the matrix circuit 3 to be added to the input color difference signal S4, resulting in the generation of the color signal S5' to drive the CRT 4 to generate the video image.

Figure 8:
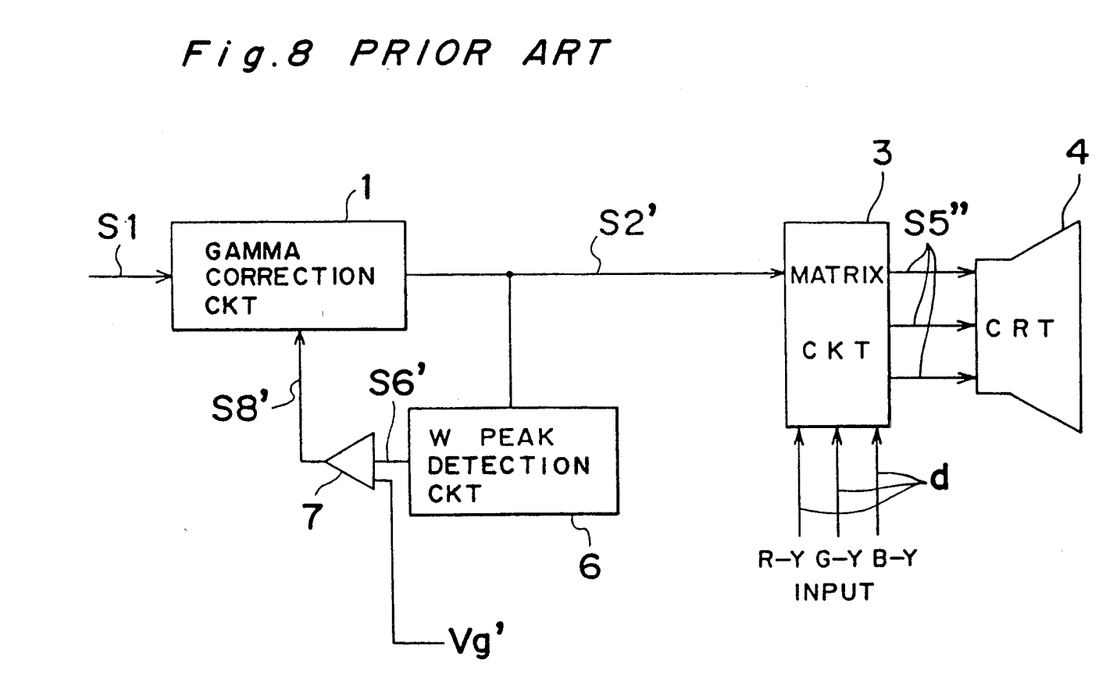
FIG. 8 is a block diagram of a second example of a conventional contrast correction device.
Figure 9A:
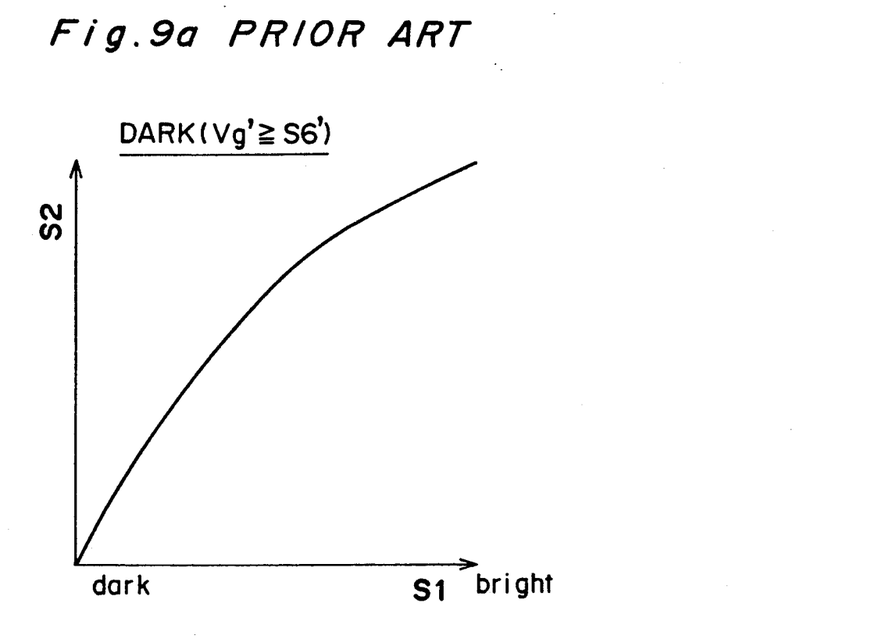
FIG. 9a and 9b are graphs showing the input-output characteristics observed in the contrast correction device shown in FIG. 8.
Figure 9B:
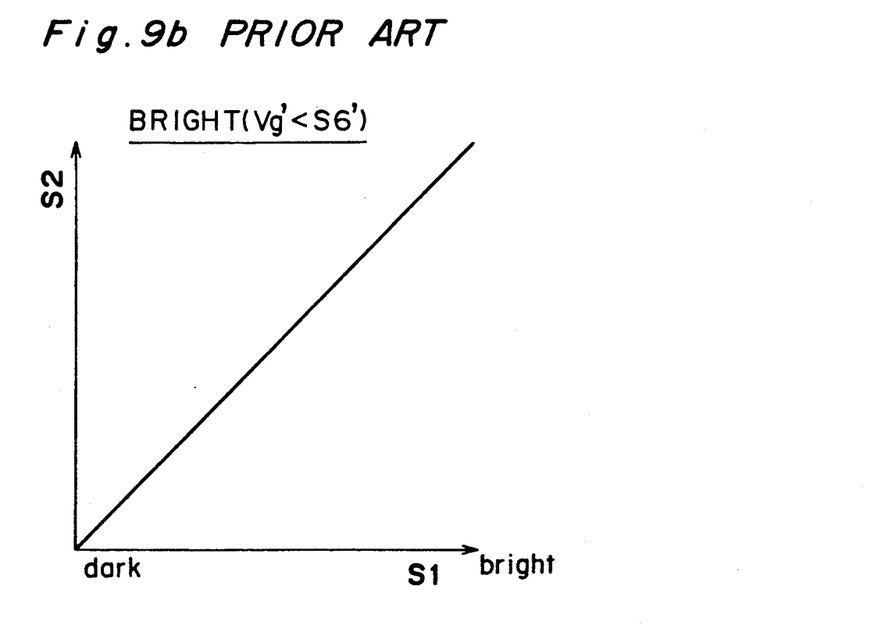

FIGS. 8, 9a and 9b are, respectively, a block diagram and graphs showing the input-output characteristics according to a second example of a conventional contrast correction device. When compared with the example shown in FIG. 6, the contrast correction device shown in FIG. 8 has, in place of the average luminance detection circuit 2, a white peak level detection circuit 6 which detects the whitest level of the post-correction luminance signal S2' to output a white peak signal S6', and a white peak comparison circuit 7 which compares the white peak detection signal S6' with a predetermined white peak level signal Vg' set externally and outputs the result as a white peak comparison signal S8'.

The contrast correction device of FIG. 8 operates as described below.

First, the post-correction luminance signal S2' is input to the white peak level detection circuit 6 to detect the white peak level (the luminance of the whitest part of the video signal) over a predetermined time which may be more than one vertical scan period. The detected white peak level is output as the white peak detection signal S6' (the level of which increases as the white peak level increases) and is compared by the white peak comparison circuit 7 with an externally set white peak level voltage Vg', thus yielding the white peak comparison signal S8', which is input to the gamma correction circuit 1.

The gamma correction circuit 1 changes the input-output characteristics as shown in FIGS. 9a and 9b according to the white peak comparison signal S8'. When the voltage level of the white peak level voltage Vg' is equal to or greater than the white peak detection signal S6' (i.e., when the image is dark overall), the light tones are suppressed as shown in FIG. 9a to enhance the dark tones. When the white peak level voltage Vg' is less than the white peak detection signal S6' (i.e., when the image is bright overall), correction is suppressed as shown in FIG. 8b for better enhancement of the light tones when compared with FIG. 9a. The post-correction luminance signal S2' thus obtained is input to the matrix circuit 3 where it is added to the input color difference signal d to generate the color signal S5", which is then used to drive the CRT 4 and generate the video image.

However, with conventional contrast correction devices as described above, when the average luminance is bright in the first example, or the white peak detection signal S6' level is high (bright) in the second example, the gamma input-output characteristics of light or white tones are simply made approximately linear. This does not make it possible to expand the dynamic range, resulting in the need to further expand the dynamic range to achieve a high image quality in large-screen television displays.

SUMMARY OF THE INVENTION

The object of the present invention is therefore to provide a contrast correction device which solves these problems.

The present invention has been developed with a view to substantially solving the above described disadvantages and has for its essential object to provide an improved contrast correction device.

In order to achieve the aforementioned objective, a contrast correction device for correcting a contrast of an image formed by video signals by varying a luminance signal, comprises a brightness detecting means for detecting whether or not the image is brighter than a predetermined brightness; and a correction means for correcting the luminance signal by a negative gamma correction when the image is detected as brighter than the predetermined brightness, whereby the contrast of bright image areas in the image are enhanced.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Embodiment

Figure 1:
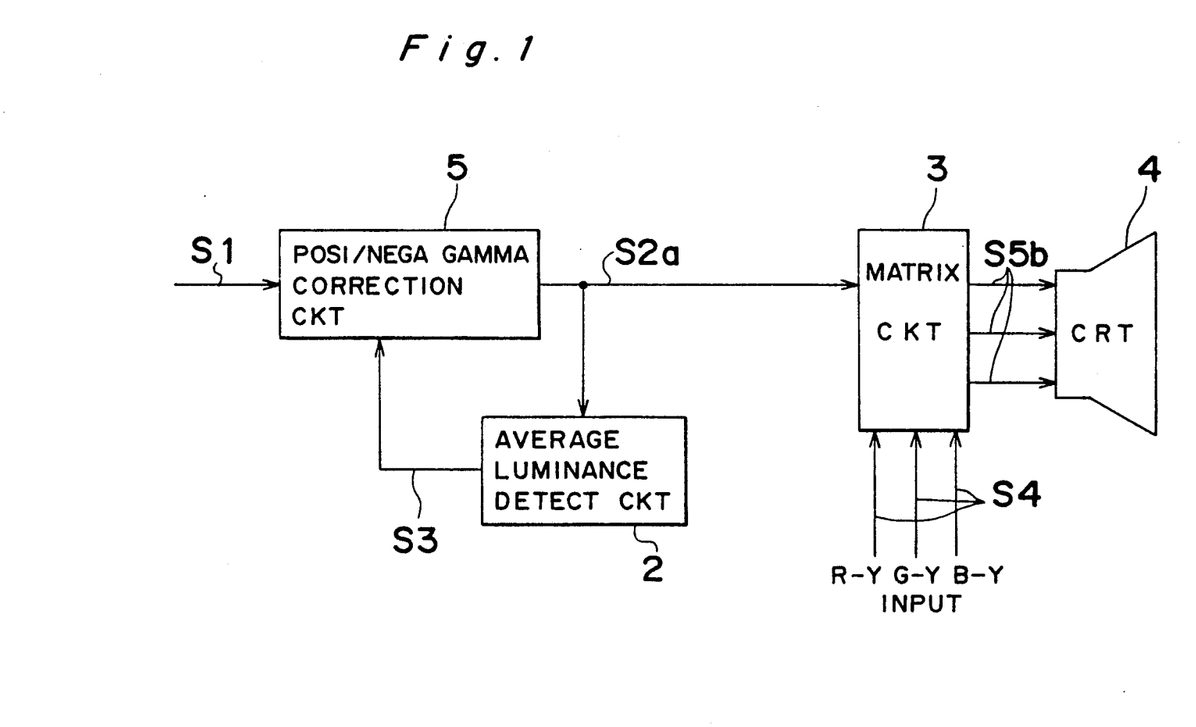
FIG. 1 is a block diagram of a contrast correction device according to a first embodiment of the present invention.

Referring to FIG. 1, a contrast correction device according to a first embodiment of the present invention is shown. The contrast correction device comprises a positive/negative gamma correction circuit 5 for correcting the contrast of luminance signal S1 according to the average luminance signal S3 as described below. When the average luminance signal S3 is relatively low, indicating that the image is dark, the positive gamma correction characteristics is applied for contrast correction whereby the contrast of light or white tones in the luminance signal S1 is suppressed for the better enhancement of dark tones. When the average detected luminance signal S3 is bright, negative gamma correction characteristics are applied for contrast correction whereby the contrast of light tones is enhanced as will be described in detail later. The average luminance detection circuit 2, matrix circuit 3, and CRT 4 are the same as those used in the conventional contrast correction device described hereinabove.

The average luminance detection circuit 2 receives the post-correction signal S2a and takes an average over one or a number of frames to produce an average luminance signal S3 as shown in FIGS. 5a to 5e. The average luminance signal S3 is then input to the positive/negative gamma correction circuit 5.

Figure 5A:
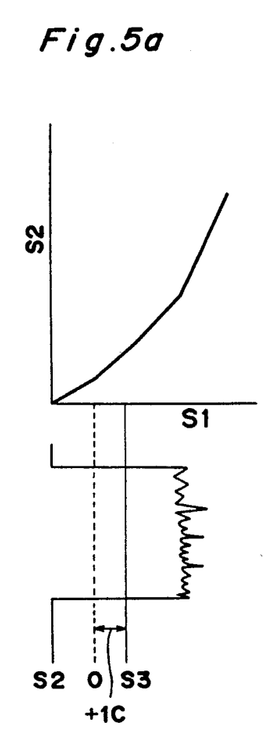
FIGS. 5a, 5b, 5c, 5d, and 5e are graphs showing the input-output characteristics observed in various conditions.
Figure 5B:
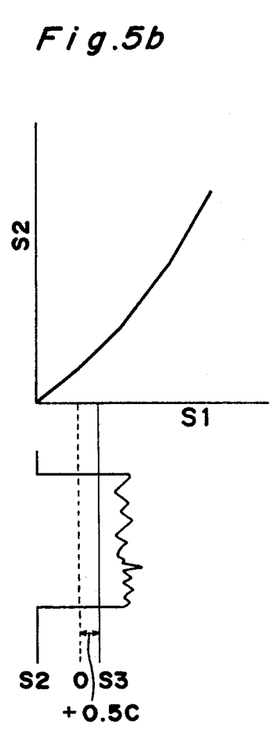
Figure 5C:
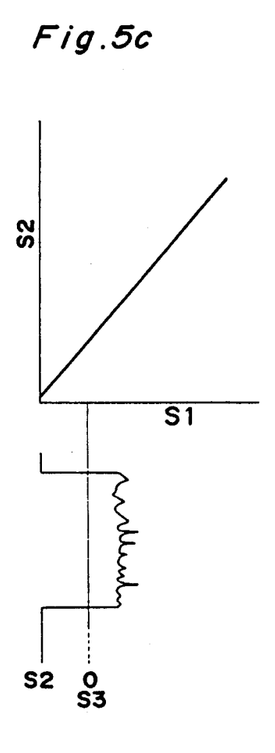
Figure 5D:
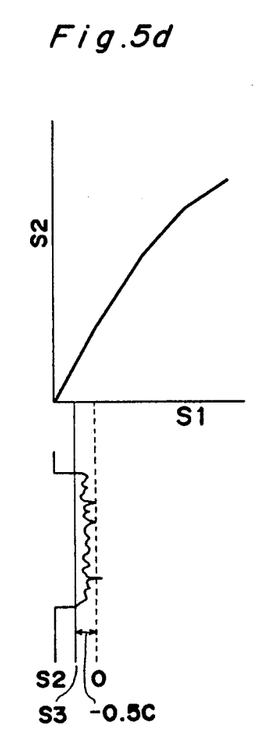
Figure 5E:
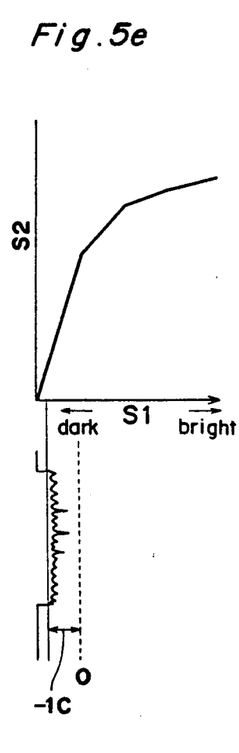

When the detected average luminance is low (dark), such as in the case of FIG. 5e, the average luminance signal S3 will be relatively low, such as −C in which C=1 according to the present embodiment. In response to signal S3, which is −C in this case, the positive gamma correction is carried out in the positive/negative gamma correction circuit 5 so as to establish the input/output characteristics of the gamma correction circuit 5 that bends downward as shown in FIG. 5e in a manner which will be described in detail later. Thus the contrast of bright (white) tone areas is suppressed for the better enhancement of the dark tone areas.

When the detected average luminance is a medium contrast, such as in the case of FIG. 5c, the average luminance signal S3 will take an intermediate level, such as 0. In response to signal S3, which is 0 in this case, no gamma correction is carried out in the positive/negative gamma correction circuit 5 so as to establish the input/output characteristics of the gamma correction circuit 5 that extends straight as shown in FIG. 5c.

When the detected average luminance is high (bright) such as in the case of FIG. 5a, the average luminance signal S3 will be relatively high, such as +C. In response to signal S3, which is +C in this case, the negative gamma correction is carried out in the positive/negative gamma correction circuit 5 so as to establish the input/output characteristics of the gamma correction circuit 5 that bends upward as shown 10 in FIG. 5a. Thus the contrast of light (white) tone areas is enhanced.

When the detected average luminance is slightly low or slightly high, the average luminance signal S3 will be at corresponding levels, such as −0.5C or +0.5C, as shown in FIGS. 5d or 5b, respectively. In such cases, the input/output characteristics of the correction circuit 5 will be slightly bent downwards or upwards or downwards as shown in FIGS. 5d and 5b, respectively.

Figure 2:
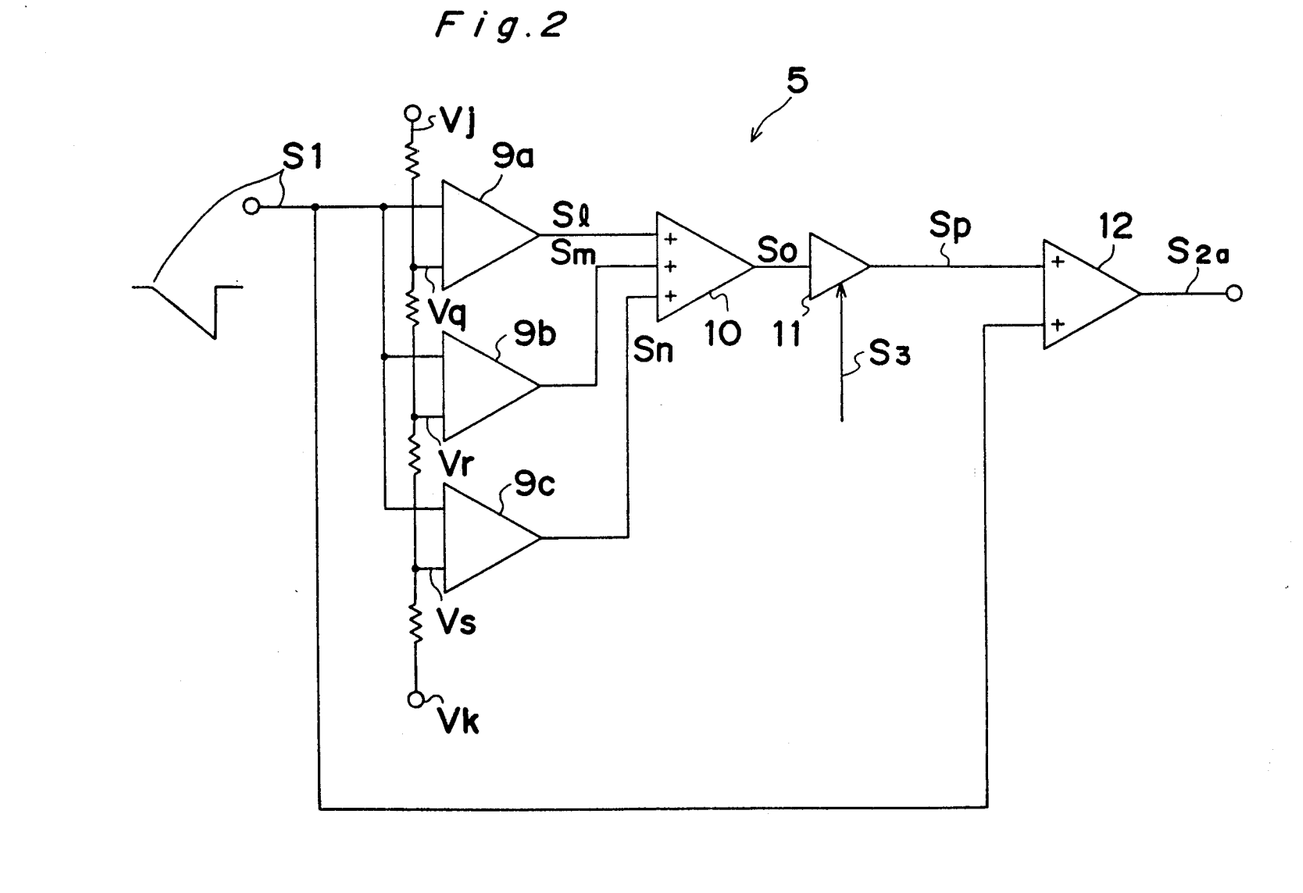
FIG. 2 is a block diagram of a positive/negative gamma correction circuit shown in FIG. 1.
Figure 3:
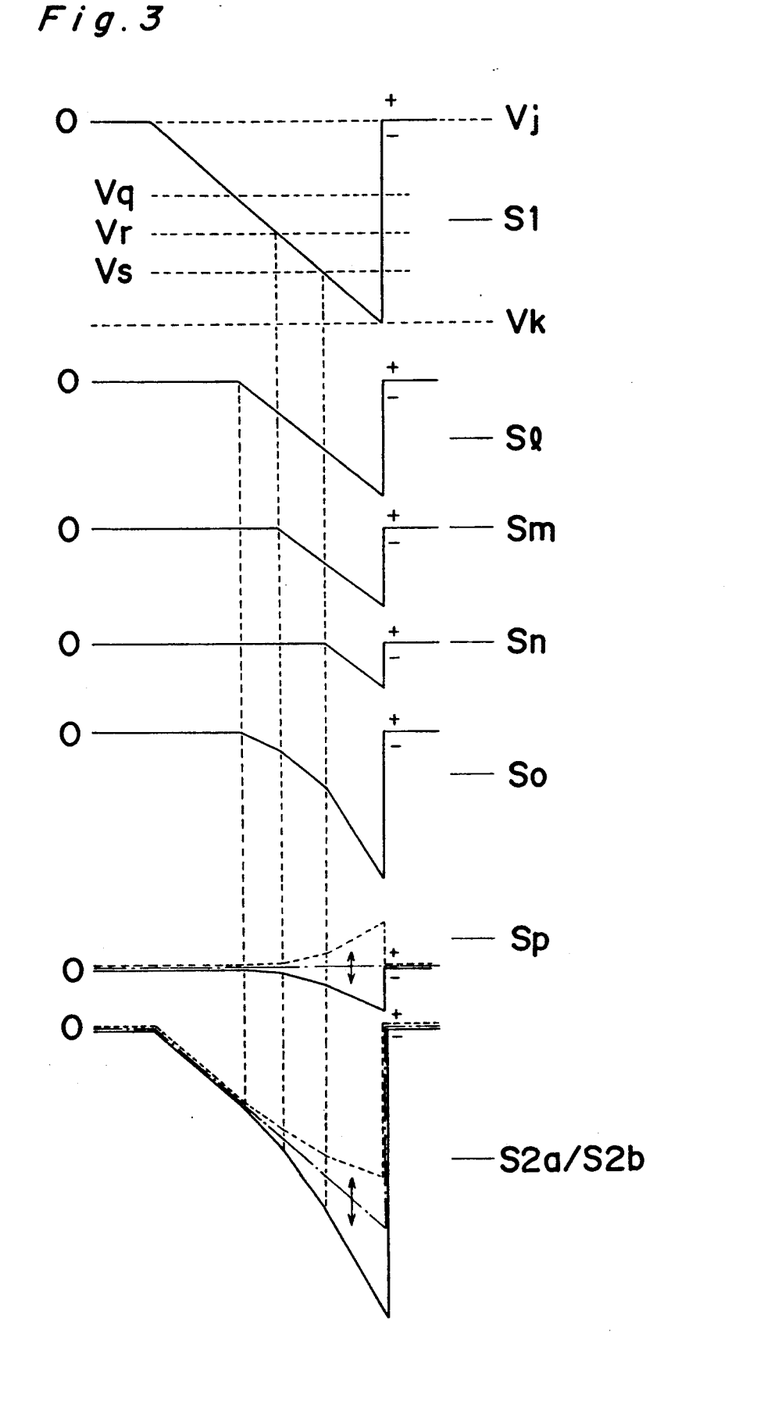
FIG. 3 is a graph showing waveforms of signals observed at various places in the contrast correction device shown in FIG. 2.

Referring to FIG. 2, a detailed block diagram of the positive/negative gamma correction circuit 5 is shown. The luminance signal S1 is shown as a waveform of a negative going signal. The positive/negative gamma correction circuit 5 comprises one or more, such as three in the example shown in FIG. 2, slice circuits 9a, 9b, and 9c, and a voltage divider defined by a plurality of resistors connected in series between a line carrying pedestal voltage Vj and a line carrying white peak voltage Vk to produce reference voltages Vq, Vr and Vs. Note that Vq<Vr<Vs. Slice circuit 9a compares the input luminance signal S1 with the predetermined reference voltage Vq which is between voltages Vj and Vk and produces an output Sl corresponding to a portion of the input luminance signal S1 that has exceeded the reference voltage Vq, as shown in FIG. 3. Similarly, slice circuit 9b produces an output Sm corresponding to a portion of the input luminance signal S1 that has exceeded the reference voltage Vr and slice circuit 9c produces an output Sn corresponding to a portion of the input luminance signal S1 that has exceeded the reference voltage Vs.

An adder 10 is provided for adding the compared luminance signals Sl, Sm, and Sn to produce a correction signal So, as shown in FIG. 3. The correction signal So is amplified in a gain control circuit 11, the gain of which is controlled by the average luminance signal S3 to be between −C and +C. Thus, gain control circuit 11 produces a control correction signal Sp, as shown in FIG. 3, in which the solid line is obtained when S3=+C, and the dotted line is obtained when S3=−C, and the dot-dash line is obtained when S3=0. Then, an adder circuit 12 adds the control correction signal Sp and luminance signal S1 to produce the post-correction luminance signal S2a, which is also shown in three different conditions using a solid line, dotted line and dot-dash line. The dotted line corresponds to the case shown in FIG. 5e in which the positive gamma correction is obtained; the solid line corresponds to the case shown in FIG. 5a in which the negative gamma correction is obtained; and the dot-dash line corresponds to the case shown in FIG. 5c in which no gamma correction is obtained.

It is to be noted that an negative gamma input-output characteristics are obtained when the gain of the gain control circuit 11 is negative, and a positive gamma input output characteristics are obtained when the gain is positive. In the present embodiment, the input-output characteristics are varied by the use of three slice circuits 9a, 9b and 9c, but the number the slice circuits may be any other number greater than one.

According to the contrast correction device of the present embodiment, it is possible to obtain positive gamma input-output characteristics when the average value is dark and negative gamma input-output characteristics when the average value is bright. Thus, when the averaged brightness level of one or several image frames has a relatively high level, the contrast of the light tone areas will be enhanced. On the other hand, when the average brightness level of one or several image frames has a relatively low level, the contrast of the dark tone areas will be enhanced.

Second Embodiment

An alternative embodiment of the present invention will be described hereinbelow with reference to the accompanying figures.

Figure 4:
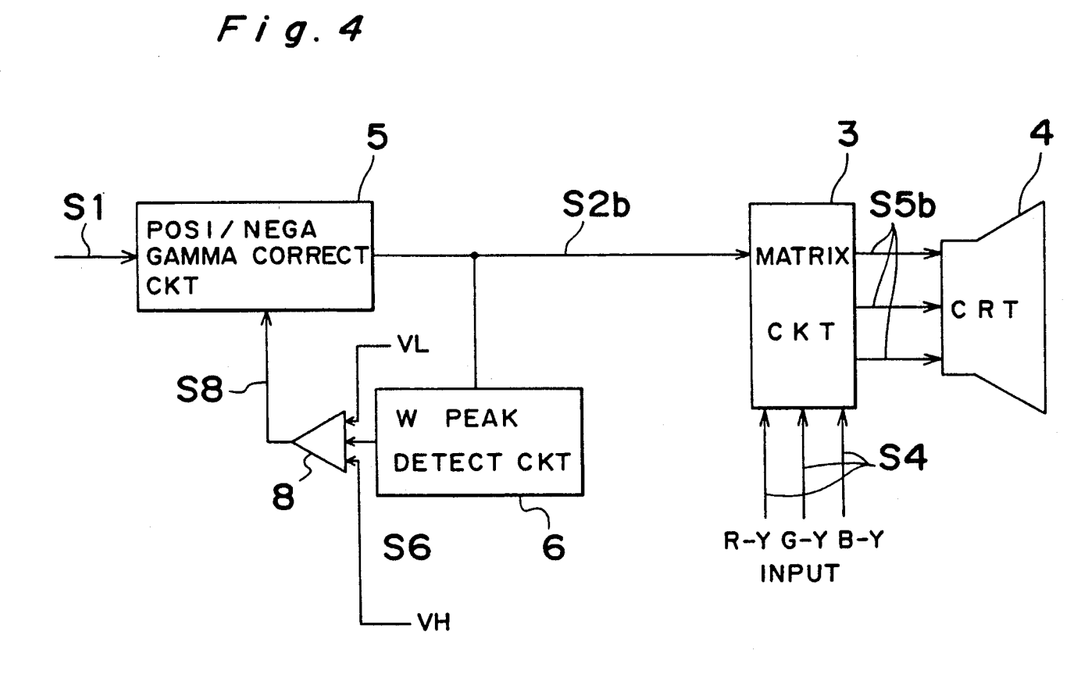
FIG. 4 is a block diagram of a contrast correction device according to a second embodiment of the present invention.

Referring to FIG. 4, a block diagram of a contrast correction device according to a second embodiment of the present invention is shown. According to the second embodiment, the average luminance detecting circuit 2 is replaced with a white peak level detection circuit 6 which produces a white peak detection signal S6 as shown in FIGS. 5a-5e. The white peak detection signal S6 is compared in a comparator 8 with a high threshold voltage VH and a low threshold voltage VL.

When the white peak detection signal S6 is greater than the high threshold voltage VH, a signal S8 produced from comparator 8 is at a high level, such as +C. Thus, the negative gamma input-output characteristics is established in the positive/negative gamma correction circuit 5 in a similar manner to that described above. This condition is shown in FIG. 5a.

When the white peak detection signal S6 is smaller than the low threshold voltage VL, the signal S8 from comparator 8 is at a low level, such as −C. Thus, the positive gamma input-output characteristics is established in the positive/negative gamma correction circuit 5 in a similar manner described to that above. This condition is shown in FIG. 5e.

When the white peak detection signal S6 is between the high and low threshold voltages VH and VL, the signal S8 from comparator 8 is in an intermediate level, such as 0. Thus, no gamma correction is added to the characteristic line in the positive/negative gamma correction circuit 5. This condition is shown in FIG. 5c.

In other words, according to the second embodiment, when the white peak detection signal S6 is smaller than the low threshold VL, (i.e., when the image itself is considered to be dark), the contrast of light or white tone areas is suppressed for the better enhancement of dark tone areas as shown in FIG. 5e. When the white peak detection signal S6 is between the low and high thresholds VL and VH, a linear characteristic is applied as shown in FIG. 5c. When the white peak detection signal S6 is greater than the high threshold VH (i.e., when the image itself is considered to be bright), the contrast of light tone areas is enhanced as shown in FIG. 5a.

Thus, the contrast of light tone areas (dynamic range) can be extended by suppressing the contrast of light or white tone areas to enhance the contrast of dark tone areas when the white peak level is low (dark), and enhancing the contrast of light or white tone areas when the white peak level is relatively high (bright).

It is to be noted that in the first embodiment of the present invention the input signal to the average luminance detection circuit 2 is the post-correction luminance signal S2a but the luminance signal S1 may also be input thereto.

Furthermore, in the second embodiment of the present invention the input signal of the white peak level detection circuit 6 is the post-correction luminance signal S2b, but the luminance signal S1 may also be input thereto.

According to the contrast correction device it is possible to extend the dynamic range of a video signal on the white contrast region by providing a positive/negative gamma correction circuit in the contrast correction device.

It is more effective to provide a gain control device in a stage before the positive/negative gamma correction circuit 5 so as to control the rising angle $\theta$ of input-output characteristics line relative to the darkness of the image.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A contrast correction device for controlling a contrast of an image formed by video signals by varying a luminance signal, comprising:
   an average detection circuit for detecting an average luminance level of a video signal; and
   at least one slice circuit for slicing an input luminance signal comprising:
   a voltage divider for dividing the potential difference between a pedestal voltage of the video signal and a white peak voltage thereof;
   an adder circuit for adding the output signals from said slice circuit;
   a gain control circuit for controlling the gain of the output from said adder circuit from a negative to a positive level according to said average luminance level and for producing a gain controlled signal; and
   another adder for adding the gain controlled signal from said luminance signal, such that the contrast correction is changed from positive gamma correction characteristics to negative gamma correction characteristics according to the average value of the video signal.

2. A contrast correction device as claimed in claim 1 is employed in a television receiver.

3. A contrast correction device for controlling a contrast of an image formed by video signals by varying a luminance signal, comprising:

a white peak level detection circuit for detecting the white peak level of a video signal; and at least one slice circuit for slicing an input luminance signal comprising:

a voltage divider for dividing the potential difference between a pedestal voltage of said video signal and a white peak voltage thereof;

an adder circuit for adding the output signals from said slice circuit;

a gain control circuit for controlling the gain of the output from said adder circuit from a negative to a positive level according to the white peak level; and another adder for adding the gain controlled signal from said luminance signal, such that the contrast correction is changed from positive gamma correction characteristics to negative gamma correction characteristics according to the white peak level.

4. A contrast correction device as claimed in claim 3 is employed in a television receiver.

* * * * *